(12) United States Patent
Fuse

(10) Patent No.: US 7,900,356 B2
(45) Date of Patent: Mar. 8, 2011

(54) DEVICE FOR ASSEMBLING TAPERED ROLLER BEARING

(75) Inventor: Masaru Fuse, Kashihara (JP)

(73) Assignee: JTEKT Corporation, Osaka (JP)

( * ) Notice: Subject to any disclaimer, the term of this patent is extended or adjusted under 35 U.S.C. 154(b) by 1213 days.

(21) Appl. No.: 11/512,426

(22) Filed: Aug. 30, 2006

(65) Prior Publication Data

US 2007/0050973 A1 Mar. 8, 2007

(30) Foreign Application Priority Data

Aug. 30, 2005 (JP) ................................ P2005-249744

(51) Int. Cl.
*B21D 53/10* (2006.01)
(52) U.S. Cl. ................. 29/898.061; 29/898; 29/898.051; 29/898.062; 29/898.064; 29/898.065
(58) Field of Classification Search .................... 29/898, 29/898.051, 898.061, 898.062, 898.064, 29/898.065
See application file for complete search history.

(56) References Cited

U.S. PATENT DOCUMENTS

| 5,046,248 A | 9/1991 | Lederman |
| 6,086,261 A * | 7/2000 | Nakagawa et al. ............ 384/571 |
| 6,562,298 B1 * | 5/2003 | Arnquist et al. ................ 422/63 |

FOREIGN PATENT DOCUMENTS

| JP | 55-077431 | 6/1980 |
| JP | 63-4233 | 1/1988 |
| JP | 8-177851 A | 7/1996 |
| JP | 2001-50281 A | 2/2001 |
| JP | 2001-208054 A | 8/2001 |
| JP | 2003-184893 | 7/2003 |

OTHER PUBLICATIONS

Japanese Office Action dated Sep. 28, 2010, issued in corresponding Japanese Application No. 2005-249744.

* cited by examiner

*Primary Examiner* — Rick K Chang
(74) *Attorney, Agent, or Firm* — Nixon & Vanderhye PC

(57) ABSTRACT

A device is provided for assembling a tapered roller bearing, which allows even a tapered roller having a large taper angle to be easily assembled to a pocket of a cage. The tapered roller (35) is inserted into the pocket (33) with the larger-diameter side of the tapered roller (35) in the lead from the inner side of the cage (30) and moreover from the smaller-diameter annular portion side of the cage (30), by which the tapered rollers (35) are assembled to the cage (30).

7 Claims, 1 Drawing Sheet

DEVICE FOR ASSEMBLING TAPERED ROLLER BEARING

BACKGROUND OF THE INVENTION

The present invention relates to a tapered roller bearing assembling device and a tapered roller bearing assembling method.

Conventionally, for assembly of tapered rollers to pockets of a cage, a tapered roller is inserted into the pocket with a smaller-diameter side of the tapered roller placed at the head from the inner side of the pocket of the cage and the circumferentially wider side of the pocket of the cage, and thereafter a larger-diameter side of the tapered roller is thrust into the circumferentially-wider side of the pocket, by which the tapered roller is assembled into the pocket of the cage.

However, with this method, in cases where a tapered roller having a large taper angle (which is an angle formed by two oblique sides in a cross section containing a center axis of the tapered roller) is assembled into the pocket, when the larger-diameter side of the tapered roller is thrust into the pocket, a gap between the larger-diameter side of the tapered roller and an edge of the pocket becomes excessively small, so that the larger-diameter side of the tapered roller becomes more liable to catching at the edge, causing a difficulty in assembling the tapered roller into the pocket, disadvantageously.

SUMMARY OF THE INVENTION

Accordingly, an object of the present invention is to provide a device and a method for assembling a tapered roller bearing by which even tapered rollers having a large taper angle can be assembled into pockets of a cage with simplicity.

In order to achieve the above object, according to the present invention, there is provided a tapered roller bearing assembling device with which a tapered roller is inserted into a pocket of a cage from an inner side of the cage with a larger-diameter side of the tapered roller in the lead.

In the insertion of a tapered roller into a pocket of a cage with the smaller-diameter side of the tapered roller placed at the head, since the tapered roller is inserted into the pocket of the cage with the smallest-diameter portion in the tapered roller in the lead, the tapered roller becomes less liable to catching at edges of the pocket of the cage, so that the head of the tapered roller can more easily be thrust into the pocket. On the other hand, in the insertion of the tapered roller into the pocket of the cage with the larger-diameter side of the tapered roller placed at the head, since the tapered roller is inserted into the pocket of the cage with the largest-diameter portion of the tapered roller in the lead, the tapered roller becomes more liable to catching at edges of the pocket of the cage, so that the head of the tapered roller can less easily be thrust into the pocket. Because of this, among those skilled in the art, there has been no technical concept that the tapered roller is inserted into the pocket of the cage with the larger-diameter side of the tapered roller in the lead.

However, the present inventor has found that in the case where the smaller-diameter side portion of the tapered roller is first thrust into the pocket, when a tapered roller having a large taper angle (which is an angle formed by two oblique sides in a cross section containing a center axis of the tapered roller), which has been drawing attention in recent years as a tapered roller capable of achieving torque reduction, is inserted into the pocket of the cage, a gap between the larger-diameter side portion and the edge of the pocket becomes excessively small, causing a difficulty in thrusting the larger-diameter side portion of the tapered roller when the larger-diameter side portion of the tapered roller is thrust after the thrusting of the smaller-diameter side portion into the pocket. Then, it has experimentally been found out that the assembly becomes extremely difficult particularly when tapered rollers having a taper angle larger than 8° 30' (8 degrees and 30 minutes) are assembled to the pocket of the cage. Also, the present inventor has found that in the case where the tapered roller is inserted into the pocket of the cage from the larger-diameter side of the tapered roller, the gap between the smaller-diameter side and the edge of the pocket becomes larger when the smaller-diameter side portion of the tapered roller is thrust into the pocket after the thrusting of the larger-diameter side portion of the tapered roller into the pocket, as compared to when the smaller-diameter side portion of the tapered roller is first thrust into the pocket, making it easier to assemble the tapered roller to the cage, and moreover that even tapered rollers having a taper angle larger than 8° 30' (8 degrees and 30 minutes) can be assembled to the pocket of the cage without any difficulty.

According to the present invention, since the tapered roller is inserted into the pocket of the cage from the inner side of the cage with the larger-diameter side of the tapered roller in the lead, even tapered rollers having larger taper angles can easily be assembled to the cage.

In an embodiment, the tapered roller bearing assembling device comprises a guide passage which is opened inside the cage and which guides the tapered roller toward the pocket from inside of the cage with the larger-diameter side of the tapered roller in the lead; and a presser unit pressing the tapered roller inward of the pocket.

According to this embodiment, since the tapered roller bearing assembling device has the guide passage which guides the tapered roller toward the pocket and the presser unit for pressing the tapered roller toward the pocket, the tapered roller can be moved smoothly toward the pocket of the cage through the guide passage, so that the larger-diameter side of the tapered roller can easily be inserted into the pocket of the cage.

In an embodiment, the tapered roller bearing assembling device comprises:

an inside jig to which the cage is externally fitted and which contains the guide passage;

a cage base which has a placement portion for placing the cage thereon and a clamp portion for fixing the cage onto the placement portion and which is rotatably externally fitted to the inside jig; and a rotating unit for rotating the cage base relative to the inside jig.

According to this embodiment, by rotating the cage base by means of the rotating unit, the cage fixed to the placement portion can be rotated relative to a tapered-roller thrust-side opening of the guide passage formed in the inside jig. Therefore, since the pocket of the cage can be rotated relative to the opening, the tapered rollers can be assembled one after another automatically and promptly to a plurality of pockets formed circumferentially of the cage in units of specified intervals.

In an embodiment, the inside jig includes an inner ring retaining portion for positioning and retaining an inner ring, and the tapered roller bearing assembling device further comprises:

a cage base moving unit for moving the cage base toward the inner ring to assemble the cage, to which the tapered rollers have been assembled, to the inner ring, and a cage caulking unit for caulking the cage which has been assembled to the inner ring by the cage base moving unit.

According to this embodiment, the inner ring can be positioned and retained to the inner ring retaining portion, and moreover, the cage can be assembled to the inner ring by moving the cage base toward the inner ring side by means of the cage base moving unit in a state that the inner ring is retained by the inner ring retaining portion. Furthermore, the tapered rollers, the cage and the inner ring can be joined together by caulking the cage assembled to the inner ring by means of the cage caulking unit.

Also, according to the present invention, there is provided a tapered roller bearing assembling method including inserting a tapered roller into a pocket of a cage from an inner side of the cage with a larger-diameter side of the tapered roller in the lead.

According to this invention, even tapered rollers having a large taper angle can be assembled to the cage without difficulty.

There is provided a tapered roller bearing assembling method comprising:

a tapered roller assembling step for inserting a tapered roller into a pocket of a cage from an inner side of the cage with a larger-diameter side of the tapered roller in the lead to make the tapered roller assembled into the pocket;

a cage assembling step for, after the tapered roller assembling step, assembling the cage, which has the tapered rollers accommodated in the pocket, to the inner ring; and a cage caulking step for, after the cage assembling step, caulking the cage assembled to the inner ring.

In this case, even tapered rollers having a large taper angle can be assembled to the cage with simplicity. Moreover, in the cage assembling step and the cage caulking step, the tapered rollers, the cage and the inner ring can be joined together.

According to the tapered roller bearing assembling device and the tapered roller bearing assembling method of the present invention, since the tapered rollers are inserted into the pocket of the cage from the inner side of the cage with the larger-diameter side of the tapered rollers in the lead, even tapered rollers having a large taper angle can be assembled to the cage without difficulty.

BRIEF DESCRIPTION OF THE DRAWINGS

The present invention will become more fully understood from the detailed description given hereinbelow and the accompanying drawings which are given by way of illustration only, and thus are not intended to limit the present invention, and wherein.

DETAILED DESCRIPTION OF THE INVENTION

Figure 1:
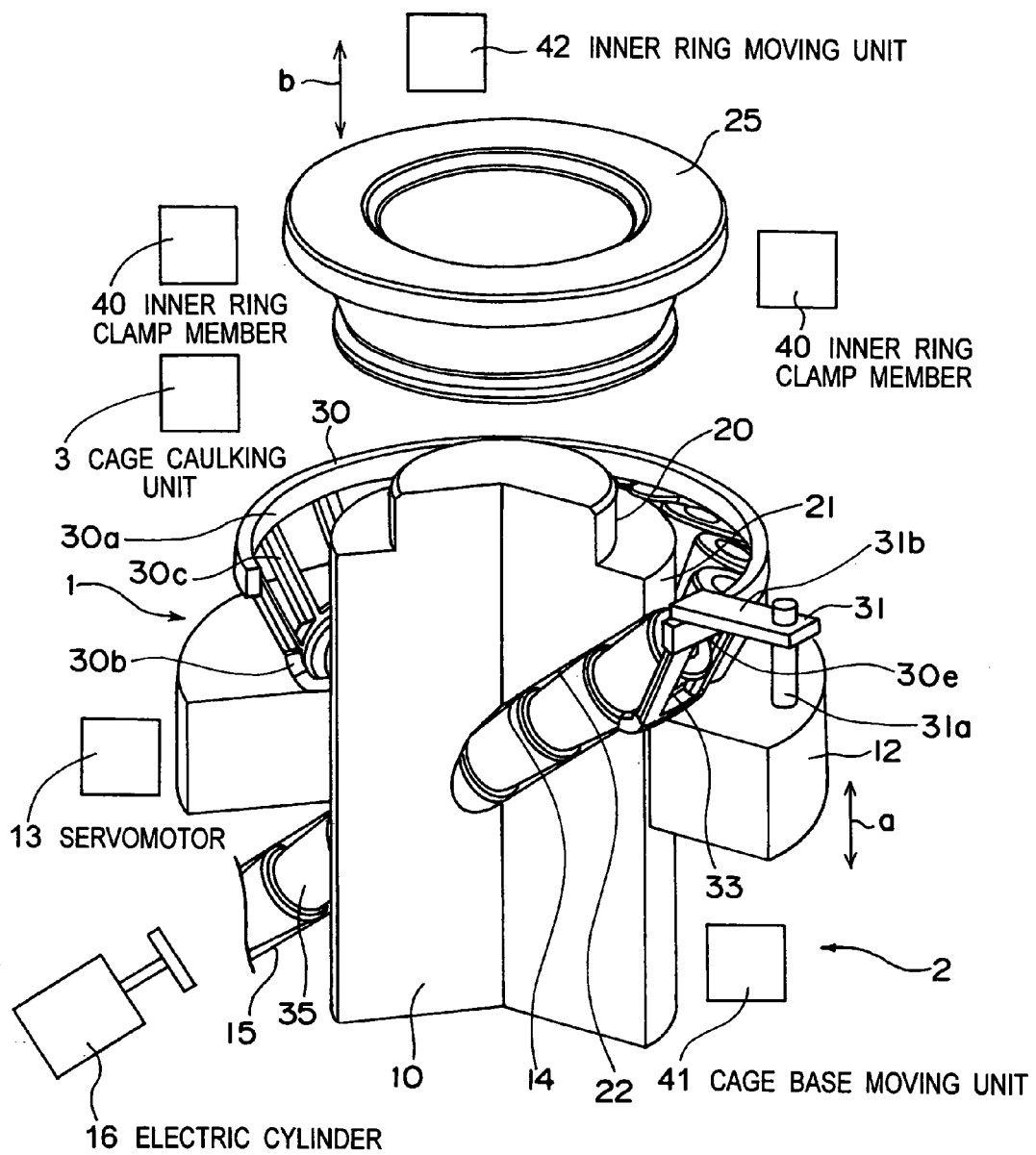
FIG. 1 is a schematically partially cutaway view of a tapered roller bearing assembling device according to an embodiment of the present invention.

Hereinbelow, the present invention will be described with reference to an embodiment thereof illustrated in the accompanying drawing.

FIG. 1 is a schematically partially cutaway view of a tapered roller bearing assembling device according to an embodiment of the present invention.

This assembling device includes a tapered roller assembling unit 1, a cage assembling unit 2 and a cage caulking unit 3.

The tapered roller assembling unit 1 includes an inside jig 10, a cage base 12, a servomotor 13 as an example of a rotating unit for rotating the cage base 12 relative to the inside jig 10, a guide passage 14 and an electric cylinder 16 as an example of a presser unit.

The inside jig 10 is fixed to an unshown base. The inside jig 10 has a smaller-diameter shaft portion 20 which has a generally cylindrical-shaped outer peripheral surface, and a larger-diameter shaft portion 21 which adjoins the smaller-diameter shaft portion 20 and which has a center axis generally coincident with a center axis of the smaller-diameter shaft portion 20 and moreover has an outer peripheral surface having an outer diameter larger than an outer diameter of the smaller-diameter shaft portion 20. The outer diameter of the smaller-diameter shaft portion 20 is only slightly smaller than an inner diameter of an inner peripheral surface of an inner ring 25 of a tapered roller bearing to be assembled by this tapered roller bearing assembling device, while an outer diameter of the larger-diameter shaft portion 21 is slightly smaller than an inner diameter of a smaller-diameter annular portion 30b of a cage 30 (which has a structure in which a larger-diameter annular portion 30a and the smaller-diameter annular portion 30b are connected to each other by means of a plurality of pillar portions 30c). An inner peripheral surface of the inner ring 25 on its smaller-diameter shaft portion side is fitted and fixed radially outward of the smaller-diameter shaft portion 20. The smaller-diameter shaft portion 20 serves as an inner ring retaining portion.

The cage base 12 is formed generally disc-shaped. The cage base 12 is rotatably fitted radially outward of the outer peripheral surface of the larger-diameter shaft portion 21. More specifically, a pillar-shaped inside-jig insertion hole whose center axis is given by a center axis of the cage base 12 is formed at a center of the cage base 12, and the inside jig 10 is inserted into the inside-jig insertion hole so that the cage base 12 is located radially outward of the larger-diameter shaft portion 21. An inner diameter of the inside-jig insertion hole is set slightly larger than the outer diameter of the larger-diameter shaft portion 21. The cage base 12 is externally fitted to the larger-diameter shaft portion 21 so as not to be in contact with the larger-diameter shaft portion 21.

An end face of the cage base 12 on its smaller-diameter shaft portion 20 side serves as a placement portion on which the cage 30 is to be placed. The cage base 12 has two clamp portions 31 for fixing the cage 30 at the end face serving as the placement portion. These two clamp portions 31 are so placed upward of the placement portion, i.e., end face and generally on one identical straight line so as to be opposed to each other with the center of the cage base 12 interposed therebetween (in FIG. 1, one of the clamp portions is omitted for simplicity). The clamp portion 31 is composed of a rotating shaft 31a which extends along the normal line of the placement portion, i.e., end face, and a plate portion 31b which is fixed to the rotating shaft 31a and which extends along a radial direction of the rotating shaft 31a. When the rotating shaft 31a is rotated relative to the cage base 12, the plate portion 31b is swiveled in the circumferential direction of the rotating shaft 31a along with the rotation of the rotating shaft 31a. After the cage 30 is placed radially outward of the larger-diameter shaft portion 21 in such a way that the smaller-diameter annular portion 30b of the cage 30 comes into contact with the placement portion, i.e., end face, the plate portion 31b is swiveled so that an end face of the larger-diameter annular portion 30a of the cage 30 is pressed toward the placement portion, i.e., end face by one face of the plate portion 31b facing the placement portion side. In this way, the cage 30 is brought into an immobile state relative to the placement portion, by which the cage 30 is fixed to the placement portion.

The cage base 12 can be rotated relative to the inside jig 10 by the servomotor 13 through a transmission member not shown. Also, the cage base 12 can be moved, while kept contactless with the larger-diameter shaft portion 21, by a cage base moving unit 41 toward a direction indicated by arrow 'a' in the axial direction of the larger-diameter shaft portion 21 between a tapered roller insertion position where a tapered roller 35 is to be inserted into a pocket 33 of the cage 30 and a cage assembling position where the cage 30 with the tapered roller 35 assembled thereto is to be assembled to the inner ring 25.

The guide passage 14 contains a generally linear-shaped through hole 22 formed in the inside jig 10. An inner diameter of the through hole 22 is set slightly larger than the outer diameter of the larger-diameter end face of the tapered roller 35. A center axis of the through hole 22 crosses the center axis of the larger-diameter shaft portion 21 to form an acute angle. In this embodiment, the angle formed by the center axis of the through hole 22 and the center axis of the larger-diameter shaft portion 21 is set to 45 to 75 degrees so that the assembly of the tapered roller 35 into the pocket 33 of the cage 30 can be achieved smoothly and easily.

In the state that the cage base 12 is positioned at the tapered roller insertion position, an opening of the through hole 22 on the smaller-diameter shaft portion 20 side is positioned on the smaller-diameter shaft portion 20 side with respect to the placement portion, i.e., end face of the cage base 12. An opening of the through hole 22 on a side opposite to the smaller-diameter shaft portion 20 side connects to a tubular member 15. This tubular member 15 forms part of the guide passage 14. Near one opening of the tubular member 15 on its one side opposite to the inside jig 10 side is placed an electric cylinder 16. The electric cylinder 16 is so designed as to press, by means of an advanceable-and-retreatable rod, a smaller-diameter end face of one tail-end tapered roller 35 on one side opposite to the smaller-diameter shaft portion 20 side out of the plurality of tapered rollers 35 which are arrayed within the guide passage 14 in line and in a string form with their larger-diameter side directed toward the smaller-diameter shaft portion 20 side opening. Thus, the electric cylinder 16 thrusts out the plurality of tapered rollers 35 arrayed in line and in a string form to the opening on the smaller-diameter shaft portion 20 side.

The cage assembling unit 2 has an inner ring clamp member 40, the cage base moving unit 41, and an inner ring moving unit 42. The inner ring clamp member 40 retains the inner ring 25 while restricting the presence position of the inner ring 25 to positions where the center axis of the inner ring 25 is positioned on an extension line of the center axis of the inside jig 10. The cage base moving unit 41 and the inner ring moving unit 42 are each composed of a linear motor, a servo controller and the like. The cage base moving unit 41, as described above, moves the cage base 12 toward the arrow 'a' direction in the axial direction of the larger-diameter shaft portion 21 so that the cage base 12 is enabled to freely move between the tapered roller insertion position and the cage assembling position. The inner ring moving unit 42, on the other hand, moves the inner ring 25 from an inner ring mounting position which is a specified distance away from the end face of the smaller-diameter shaft portion 20 along a normal-line direction of the end face to the cage assembling position where the smaller-diameter side end face of the inner ring 25 is positioned on the smaller-diameter shaft portion 20 side end face of the larger-diameter shaft portion 21, toward an arrow 'b' direction along the positions restricted by the inner ring clamp member 40.

The cage caulking unit 3 functions to caulk the smaller-diameter annular portion 30b of the cage, 30 radially inwardly over its entire circumference in the assembled structure of the cage 30 that the cage 30 retaining the tapered rollers 35 is assembled radially outward of the inner ring 25, by which the assembled structure is inseparably joined. This caulking is to be executed by covering the structure with a metal mold and pressing the smaller-diameter annular portion 30b with the metal mold to squeeze the smaller-diameter annular portion 30b radially inwardly.

With the use of the tapered roller bearing assembling device of the above construction, a tapered roller bearing is assembled as shown below.

First, a tapered roller assembling step is performed. In this tapered roller assembling step, the cage base 12 is moved to the tapered roller insertion position by the cage base moving unit 41. Thereafter, the cage 30, which is so structured that the larger-diameter annular portion 30a and the smaller-diameter annular portion 30b are coupled to each other by means of a plurality of pillar portions 30c, is fixed to the cage base 12 by the clamp portion 31 while the smaller-diameter annular portion 30b of the cage 30 is kept in contact with the placement-portion, i.e., end face of the cage base 12. Subsequently, from the opening of the guide passage 14 on a side opposite to the smaller-diameter shaft portion 20 side, the tapered roller 35 is inserted into the guide passage 14 with the larger-diameter side of the tapered roller 35 placed at the head, and this insertion is successively done for the plurality of tapered rollers 35 until the larger-diameter side of the leading tapered roller 35 on the smaller-diameter shaft portion 20 side hits against an edge portion of the pocket 33 of the cage 30. After that, simultaneously when the cage base 12 is rotated relative to the larger-diameter shaft portion 21 by the servomotor 13, the smaller-diameter side end face of the tail-end tapered roller 35 on the side opposite to the smaller-diameter shaft portion 20 side is pressed with a specified force by the rod of the electric cylinder 16, so that the tapered rollers 35 are assembled to the pocket 33 one after another. That is, the tapered roller 35 is inserted into the pocket 33 with the larger-diameter side of the tapered roller 35 placed at the head from the inner side of the cage 30 and from the smaller-diameter annular portion 30b side of the cage 30, by which the tapered rollers 35 are assembled to the cage 30. More strictly, the tapered rollers 35 are assembled to the cage 30 in the manner that the tapered roller 35 is inserted obliquely into the pocket 33 with the larger-diameter side of the tapered roller 35 placed at the head from the inner side of the cage 30 and from the narrower-circumferential-width side of the pocket 33 (i.e., the smaller-diameter annular portion 30b side of the cage 30) in a state that the center axis of the tapered roller 35 forms an acute angle against the normal line of the center of a face portion 30e in the larger-diameter annular portion 30a of the cage 30 confronting the pocket 33 (the center being generally a radial and circumferential center of a generally fan-shaped face portion 30e). In this connection, the state that the center axis of the tapered roller 35 forms an acute angle against the normal line of the center of the face portion 30e includes a case where the normal line of the center of the face portion 30e and the center axis of the tapered roller 35 does not cross each other. In this case, the state that the center axis of the tapered roller 35 forms an acute angle against the normal line of the center of the face portion 30e refers to a state that when the center axis of the tapered roller 35 is so translated as to cross the normal line of the center of the face portion 30e, the translated center axis forms an acute angle against the normal line of the center of the face portion 30e.

Next, a cage assembling step is performed. In this cage assembling step, the inner ring 25 is moved by the inner ring moving unit 42 from the inner ring mounting position to the cage assembling position along the positions restricted by the inner ring clamp member 40. Thereafter, the cage base 12 is moved by the cage base moving unit 41 from the tapered roller insertion position to the cage assembling position, where the cage 30 with the tapered rollers 35 incorporated therein is assembled to the inner ring 25.

Subsequently, a cage caulking step is performed. In this cage caulking step, the smaller-diameter annular portion 30b of the cage 30 that retains the tapered rollers 35 and is incorporated into the inner ring 25 is caulked radially inwardly over its entire circumference by the cage caulking unit 3, by which the inner ring 25, the cage 30 and the tapered rollers 35 are joined together so as to be inseparable from one another.

Finally, at another position, the joined inner ring 25, cage 30 and tapered rollers 35 are covered on their radially outer-peripheral side with a removable outer ring (not shown). Thus, the assembly of the tapered roller bearing is completed.

As described in the Summary of the Invention, the present inventor found that in the insertion of a tapered roller into a pocket of a cage for use in tapered roller bearings with the larger-diameter side of the tapered roller in the lead, the assembly of the tapered roller to the cage becomes easier to achieve because a gap between the smaller-diameter side portion and the pocket edge becomes larger when the larger-diameter side portion of the tapered roller is thrust into the pocket and then the smaller-diameter side portion of the tapered roller is thrust in, than when the smaller-diameter side portion of the tapered roller is first thrust into the pocket. Further, it was found that even a tapered roller having a taper angle larger than 8° 30' (8 degrees and 30 minutes) can be assembled to the pocket of the cage without any difficulty.

According to the tapered roller bearing assembling device of this embodiment, since the tapered roller 35 is inserted into the pocket 33 of the cage 30 from the inner side of the cage 30 with the larger-diameter side of the tapered roller 35 in the lead, even tapered rollers 35 having a large taper angle can be assembled to the cage 30 without difficulty.

Also, according to the tapered roller bearing assembling device of this embodiment, since the device has the guide passage 14 for guiding the tapered roller 35 to the pocket 33 and the electric cylinder 16 for pressing the tapered roller 35 against the pocket 33, the tapered roller 35 can be moved smoothly to the pocket 33 of the cage 30 through the guide passage 14, so that the larger-diameter side of the tapered rollers 35 can be easily inserted into the pocket 33 of the cage 30.

Also, according to the tapered roller bearing assembling device of this embodiment, the pocket 33 of the cage 30 can be rotated relative to the tapered-roller thrust-out opening of the through hole 22 by rotating the cage base 12 relative to the larger-diameter shaft portion 21 with the servomotor 13. Therefore, the tapered rollers 35 can be assembled one after another automatically and promptly to a plurality of pockets 33 formed at specified intervals along the circumferential direction of the cage 30.

Also, according to the tapered roller bearing assembling device of this embodiment, the inner ring 25 can be positioned and retained to the smaller-diameter shaft portion 20, and moreover, the cage 30 can be assembled to the inner ring 25 by moving the cage base 12 toward the inner ring 25 side by means of the cage base moving unit 41 while the inner ring 25 is retained by the smaller-diameter shaft portion 20. Furthermore, the tapered rollers 35, the cage 30 and the inner ring 25 can be joined together by caulking the cage 30 assembled to the inner ring 25 by means of the cage caulking unit 3.

Also, according to the tapered roller bearing assembling method of this embodiment, since the tapered roller 35 is inserted into the pocket 33 of the cage 30 from the inner side of the cage 30 with the larger-diameter side of the tapered roller 35 in the lead, even tapered rollers 35 having a large taper angle can be assembled to the cage 30 without difficulty.

In this embodiment, it is arranged that the cage base 12 is rotated relative to the inside jig 10 that is stationarily fixed to the base. Otherwise, in this invention, an inside jig may be set rotatable relative to a stationary cage base. Further, though the servomotor 13 is used as an example of a rotating unit in this embodiment, the rotating unit may be any other one only if it is capable of rotating the cage base 12 relative to the inside jig 10 because the tapered rollers can be assembled one after another to the pockets only with a certain force continuously applied to the tapered rollers by the presser unit while the cage base keeps rotating relative to the inside jig. In addition, a stepping motor or the like that gives rotation in units of a specified angle (corresponding to the angle of adjoining pockets) may also be used as the rotating unit. In this case, the tapered rollers are pressed by the presser unit in a state that the pocket-side opening of the guide passage corresponds to the pocket. In addition, as the rotating unit, for example, a device having a gear and a toothed belt to rotate the cage base or the like may also be used.

Furthermore, in this embodiment, the cage base 12 is externally fitted to the larger-diameter shaft portion 21 while kept contactless with the larger-diameter shaft portion 21. However, for this invention, it is also possible that a bearing (rolling bearing, static pressure bearing or fluid dynamic bearing) may be placed between the inside jig and the cage base so that the cage base is rotatably supported to the inside jig by the bearing.

Further, in this embodiment, the smaller-diameter annular portion 30b of the cage 30 is caulked by squeezing the smaller-diameter annular portion 30b of the cage 30 radially inwardly in a state that the structure made up of the inner ring 25, the cage 30 and the tapered rollers 35 is covered with a metal mold. However, for the present invention, it is also possible to adopt a caulking device having a striking part, where a plurality of sites of the smaller-diameter annular portion of the cage are struck from outside toward inside in the radial direction by the striking part to thereby execute the caulking, by which the inner ring, the cage and the tapered rollers are joined together.

Further, the cage base 12, which has two clamp portions 31 in this embodiment, yet may have three or more clamp portions 31. The presser unit, which is given by the electric cylinder 16 in this embodiment, may be a device such as air cylinder or hydraulic cylinder other than electric cylinders. Moreover, the presser unit may be of any mechanism that allows the tapered rollers to be conveyed in the radial direction, where the end face may be thrust directly by oil pressure or pneumatic pressure or pushed or pulled by magnetic force.

Embodiments of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A tapered roller bearing assembling device with which a tapered roller is inserted into a pocket of a cage from an inner side of the cage with a larger-diameter side of the tapered roller leading, comprising:

an inside jig;

a guide passage defined through the inside jig;

a cage base which has a placement portion for placing the cage thereon and a clamp portion for fixing the cage onto the placement portion, said cage base being externally fitted to the inside jig, at least one of the inside jig and the cage base being rotatable relative to the other of said inside jig and said cage base;

wherein the guide passage is open toward an inside of the cage placed on the placement portion of the cage base and guides the tapered roller toward the pocket of the cage from the inside of the cage with the larger-diameter side of the tapered roller leading; and a presser unit for pressing the tapered roller toward the pocket.

2. The tapered roller bearing assembling device as claimed in claim 1, further comprising:

a rotating unit for rotating the cage base relative to the inside jig.

3. The tapered roller bearing assembling device as claimed in claim 2, wherein the inside jig includes an inner ring retaining portion for positioning and retaining an inner ring, and the tapered roller bearing assembling device further comprising:

a cage base moving unit for moving the cage base toward the inner ring to assemble the cage, to which the tapered rollers have been assembled, to the inner ring, and a cage caulking unit for caulking the cage which has been assembled to the inner ring by the cage base moving unit.

4. The tapered roller bearing assembling device as claimed in claim 1, wherein the cage base is externally fitted to the inside jig while being kept contactless with the inside jig.

5. The tapered roller bearing assembling device as claimed in claim 1, wherein the inside jig includes a smaller-diameter shaft portion for positioning and retaining an inner ring, and a larger-diameter shaft portion to which the cage base is externally fitted.

6. The tapered roller bearing assembling device as claimed in claim 1, wherein the cage base has at least two clamp portions for fixing the cage onto the placement portion.

7. The tapered roller bearing assembling device as claimed in claim 1, wherein the presser unit comprises an electric cylinder for pressing the tapered roller toward the pocket of the cage, so that the tapered roller can be moved smoothly to the pocket of the cage through the guide passage, whereby that the larger-diameter side of the tapered roller can be easily inserted into the pocket.

* * * * *